F. BEDFORD & C. E. WILLIAMS.
PROCESS FOR THE CONVERSION OF UNSATURATED FATTY ACIDS, THEIR GLYCERIDS, AND OTHER ESTERS INTO THE CORRESPONDING SATURATED COMPOUNDS.
APPLICATION FILED AUG. 14, 1911.
1,026,339. Patented May 14, 1912.
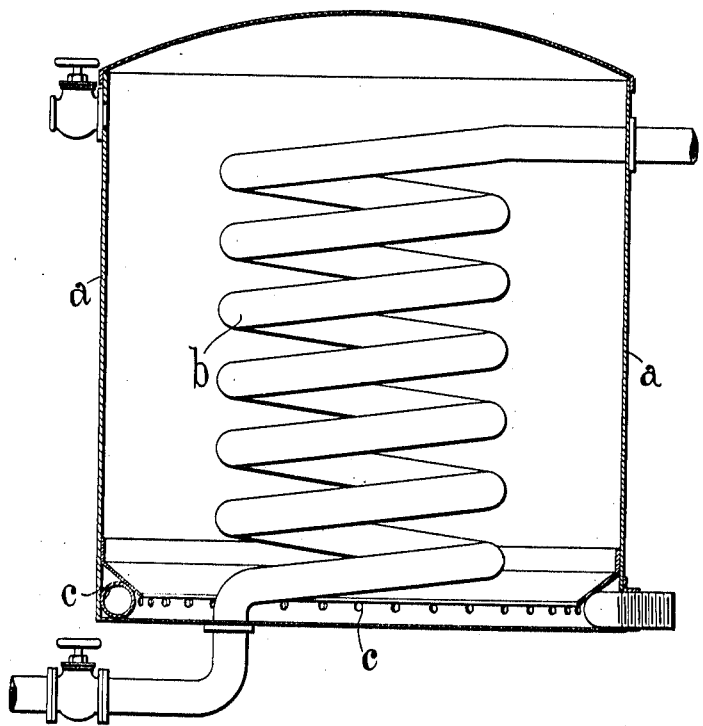

UNITED STATES PATENT OFFICE.

FRED BEDFORD AND CHARLES EDWARD WILLIAMS, OF SLEAFORD, ENGLAND.

PROCESS FOR THE CONVERSION OF UNSATURATED FATTY ACIDS, THEIR GLYCERIDS, AND OTHER ESTERS INTO THE CORRESPONDING SATURATED COMPOUNDS.

1,026,339.

Specification of Letters Patent. Patented May 14, 1912.

Application filed August 14, 1911. Serial No. 644,020.

*To all whom it may concern:*

Be it known that we, FRED BEDFORD, Ph. D., B. Sc. Lond., and CHARLES EDWARD WILLIAMS, subjects of the King of Great Britain and Ireland, and residing at Sleaford, in the county of Lincoln, England, have invented certain new and useful improvements in or relating to processes for the conversion of unsaturated fatty acids, their glycerids and other esters, into the corresponding saturated compounds.

This invention relates to a process for the conversion of unsaturated fatty acids, their glycerids and other esters into the corresponding saturated compounds, and has for its object to simplify and cheapen the carrying out of such processes.

It has hitherto been proposed to effect the conversion of unsaturated compounds as set out above into the corresponding saturated compounds by treatment with hydrogen in the presence of a catalyzer, the latter being always applied in the form of metal in a finely divided state. Finely divided copper oxid has also been proposed in connection with the conversion of liquid oleic acid into the solid in accordance with experiments by Ipatiew (*Berichte der Deutsch. Chem. Ges.* 40, 1281–1907, and 42, 2091–1909) who was also able to hydrogenate certain organic combinations, viz., benzol, naphthalene and some other aromatic hydrocarbons as well as phenal, naphthol, benzophenone and acetone in the presence of nickel oxid, but in this case it was necessary to apply the hydrogen under very great pressure about 100 atmospheres. The processes set out above, however, were necessarily expensive and uncertain on account of the difficult and extensive technical operations required for their proper carrying out. We have found, however, that the application of metallic oxids as catalytic agents in the conversion of unsaturated fats or fatty acids leads to a cheap and highly successful process, capable of being carried out at pressures commonly met with in autoclave processes such as are carried out in soap works and even at atmospheric pressure and in which it is not necessary to apply the hydrogen under pressure greater than that which is necessary to force it through the substance to be treated.

The accompanying drawing illustrates a simple and convenient form of apparatus that may be employed for the present process.

In carrying our invention into effect we employ the catalyzer in the form of an oxid, nickel oxid being found to be the most rapid of all the catalytic oxids in its action, only one-half to one per cent. of nickel oxid being in general required to be added to the oil, the latter being placed in any convenient form of tank or vessel *a* which may be heated by superheated steam passing through the coil *b* or by a fire, oil-bath or other suitable means, and through which hydrogen may be forced from the spray, or ring pipe *c*.

It is to be understood that the hydrogen or commercial gas containing hydrogen employed for the reduction is to be previously freed from injurious substances, for example, according to the method described in British specification No. 3752/10, while the organic substance to be reduced is also purified by distillation or otherwise.

The following are given by way of example only of results obtainable by the use of our invention, viz.:

Example 1: 50 liters of purified linseed oil are heated to a temperature of about 255° C., and 0.5 kgs. of fine nickel oxid or nickel protoxid are added, a powerful stream of hydrogen being forced through the hot oil. From time to time samples are taken and tested for their solidifying point; the latter is after 4¼ hours 35.5°; after 5¼ hours 42° and it may be easily increased to 47° or over. The nickel oxid or protoxid is not reduced during this process to metallic nickel and it is only when an unnecessarily large excess of the catalytically acting metallic oxid is added that it contains a certain percentage of metal after completion of the process.

A parallel experiment, in which other conditions being the same, the like or even double the quantity by weight of freshly reduced metallic nickel is used, shows that after 5½ hours at ordinary temperature linseed oil does not solidify at all. Instead of nickel oxid in Example 1 twice the quantity of cobalt oxid may be employed.

Soya oil and cotton oil when treated in a similar manner to that set out in Example 1 give similar results.

We have found that during the process, provided pure hydrogen is used, only a small amount of hydroxylated fatty substance is formed.

Example 2: 50 liters of purified oleic acid are heated to a temperature of about 255° C., and 1% of finely divided nickel oxid or protoxid is added, a powerful stream of commercial electrolytic hydrogen, which invariably contains oxygen in varying proportions, being forced through the heated oleic acid. In this case, in addition to stearic acid, varying quantities of hydroxystearic acids are formed, depending upon the amount of oxygen present, the chief of such acids being the mono-hydroxystearic acid.

Similar results may be brought about by varying the quantity of the metallic oxid, but we prefer to employ varying proportions of air or oxygen present in the hydrogen rather than to unduly increase the amount of metallic oxid although we have found that there is a limit to the amount of oxygen which is to be present for efficient working of the process.

Example 3: Purified fish oil is heated with one per cent of nickel oxid to 255° C. and a current of hydrogen, previously freed from injurious substances, is passed through. After a few hours the fish oil possesses a solidifying point of over 30° C. which may be easily raised to 40° C. and over.

Example 4: Purified linseed oil, treated with copper or iron oxid gives stearin, but the process is much slower than when nickel oxid is employed.

Having now particularly described our invention what we claim as new and desire to secure by Letters Patent is:—

1. A process for the conversion of unsaturated fatty acids, their glycerids and other esters into the corresponding saturated compounds which consists in treating substances to be reduced with purified hydrogen in the presence of heated finely divided metallic oxid the process being carried out under low pressures.

2. A process for the conversion of unsaturated fatty acids, their glycerids and other esters into the corresponding saturated compounds which consists in treating the substances to be reduced with purified hydrogen in the presence of heated finely divided nickel oxid the process being carried out under low pressures.

3. A process for the production of hydroxy-fatty acids which consists in treating unsaturated fatty acids, their glycerids and other esters with purified hydrogen mixed with oxygen in the presence of heated finely divided metallic oxid.

4. A process for the production of hydroxy-fatty acids which consists in treating unsaturated fatty acids, their glycerids and other esters with purified hydrogen mixed with oxygen, the amount of the latter gas being varied as desired to suit the required amount of hydroxylated fatty substances.

In testimony whereof, we affix our signatures in presence of two witnesses.

FRED BEDFORD.
CHARLES EDWARD WILLIAMS.

Witnesses:
JNO. WM. BELL,
HAROLD D. THACKER.